US010565702B2

(12) United States Patent
Zhang et al.

(10) Patent No.: US 10,565,702 B2
(45) Date of Patent: Feb. 18, 2020

(54) DYNAMIC UPDATES FOR THE INSPECTION OF INTEGRATED CIRCUITS

(71) Applicant: Dongfang Jingyuan Electron Limited, Beijing (CN)

(72) Inventors: Zhaoli Zhang, San Jose, CA (US); Jie Lin, San Jose, CA (US); Hua-yu Liu, San Jose, CA (US); Zongchang Yu, San Jose, CA (US)

(73) Assignee: Dongfang Jingyuan Electron Limited, Beijing (CN)

( * ) Notice: Subject to any disclaimer, the term of this patent is extended or adjusted under 35 U.S.C. 154(b) by 86 days.

(21) Appl. No.: 15/419,664

(22) Filed: Jan. 30, 2017

(65) Prior Publication Data

US 2018/0218493 A1  Aug. 2, 2018

(51) Int. Cl.
*G06T 7/00* (2017.01)
*G06F 16/25* (2019.01)
*G06F 16/23* (2019.01)

(52) U.S. Cl.
CPC ........ *G06T 7/0006* (2013.01); *G06F 16/2379* (2019.01); *G06F 16/25* (2019.01); *G06T 7/001* (2013.01); *G06T 2207/10061* (2013.01); *G06T 2207/20224* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 9,865,512 B2* | 1/2018 | Jayaraman | H01L 22/12 |
| 9,915,625 B2* | 3/2018 | Gao | G01N 21/95607 |
| 2004/0122859 A1* | 6/2004 | Gavra | H01L 22/20 |
| 2006/0010416 A1* | 1/2006 | Keck | G06F 17/30554 |
| | | | 716/51 |
| 2008/0033675 A1 | 2/2008 | Brodsky et al. | |

(Continued)

FOREIGN PATENT DOCUMENTS

JP  5104873 B2  12/2012

OTHER PUBLICATIONS

International Search Report dated Feb. 27, 2018 from corresponding PCT Application No. PCT/US2017/059031.

*Primary Examiner* — Jiangeng Sun
(74) *Attorney, Agent, or Firm* — Young Basile Hanlon & MacFarlane, P.C.

(57) ABSTRACT

Methods and systems for inspecting integrated circuits are provided. The method includes monitoring an inspection of integrated circuits to receive inspection data including machine data and defect detection results, storing the inspection data in a database, modifying, via the database, at least one of a plurality of recipe files associated with the inspection based on the machine data, and modifying, via the database, at least one of a plurality of software parameters associated with the inspection based on the defect detection results. The system includes a memory including instructions executable by a processor to monitor an inspection of integrated circuits to receive and store inspection data including machine data and defect detection results in a database, modify, via the database, a recipe file associated with the inspection based on the machine data, and modify, via the database, a software parameter associated with the inspection based on the defect detection results.

18 Claims, 9 Drawing Sheets

(56) References Cited

U.S. PATENT DOCUMENTS

| | | | |
|---|---|---|---|
| 2008/0163094 A1* | 7/2008 | Pannese | G03F 7/70525 |
| | | | 715/772 |
| 2009/0290782 A1 | 11/2009 | Regensburger | |
| 2009/0299681 A1 | 12/2009 | Chen et al. | |
| 2012/0314054 A1* | 12/2012 | Chou | G05B 19/41875 |
| | | | 348/87 |
| 2014/0198974 A1* | 7/2014 | Takagi | H01L 22/12 |
| | | | 382/149 |
| 2014/0376801 A1* | 12/2014 | Karsenti | G06T 7/001 |
| | | | 382/145 |
| 2015/0005917 A1* | 1/2015 | Yiin | G03F 1/36 |
| | | | 700/109 |
| 2015/0006103 A1* | 1/2015 | De Wel | H01L 22/12 |
| | | | 702/123 |
| 2015/0146967 A1* | 5/2015 | Miyamoto | H01J 37/28 |
| | | | 382/145 |
| 2015/0346610 A1* | 12/2015 | Tam | G03F 7/70666 |
| | | | 355/55 |
| 2017/0200265 A1* | 7/2017 | Bhaskar | G06T 7/0006 |
| 2017/0262975 A1* | 9/2017 | Fudeya | G06T 7/0008 |
| 2017/0371981 A1* | 12/2017 | Fujita | G05B 19/41875 |
| 2018/0130195 A1* | 5/2018 | Uppaluri | G06T 7/0004 |

* cited by examiner

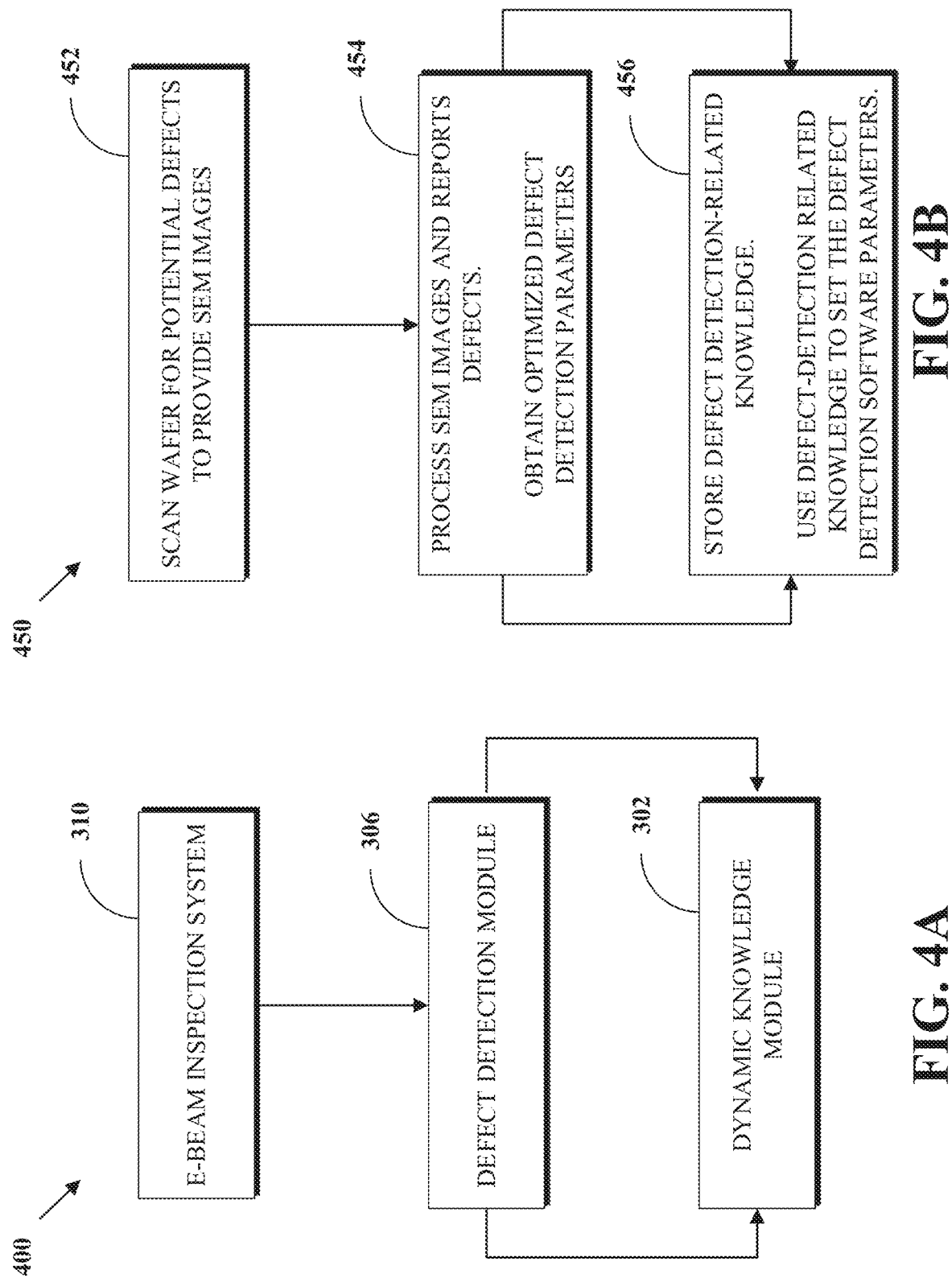

DYNAMIC UPDATES FOR THE INSPECTION OF INTEGRATED CIRCUITS

TECHNICAL FIELD

This disclosure relates generally to inspecting integrated circuits fabricated on wafers, and more specifically, to dynamic updates for the inspection of integrated circuits.

BACKGROUND

The manufacture of microchip devices is a multi-step process carried out on a substrate such as a wafer. Multiple integrated circuits (ICs) are typically produced on a wafer. Each IC is known as a die. Die inspection is one step of the manufacturing process. Inspection systems can detect defects that occur during the manufacturing process. Optical wafer inspection systems have been conventionally used for wafer and/or die inspection.

SUMMARY

Disclosed herein are aspects, features, elements, and implementations of providing dynamic updates for the inspection of integrated circuits.

In a first aspect, a method for inspecting integrated circuits is provided. The method includes monitoring an inspection of integrated circuits to receive inspection data which includes machine data and defect detection results, storing the inspection data in a database, modifying, via the database, at least one of a plurality of recipe files associated with the inspection based on the machine data, and modifying, via the database, at least one of a plurality of software parameters associated with the inspection based on the defect detection results.

In a second aspect, a system for inspecting integrated circuits is provided, wherein the system includes a processor and a memory coupled to the processor. The memory includes instructions executable by the processor to monitor an inspection of integrated circuits to receive inspection data which includes machine data and defect detection results, store the inspection data in a database, modify, via the database, at least one of a plurality of recipe files associated with the inspection based on the machine data, and modify, via the database, at least one of a plurality of software parameters associated with the inspection based on the defect detection results.

In a third aspect, a non-transitory computer readable storage medium for inspecting integrated circuits is provided, wherein the non-transitory computer readable storage medium includes executable instructions that, when executed by a processor, facilitate performance of operations. The operations include monitoring an inspection of integrated circuits to receive inspection data which includes machine data and defect detection results, storing the inspection data in a database, modifying, via the database, at least one of a plurality of recipe files associated with the inspection based on the machine data, and modifying, via the database, at least one of a plurality of software parameters associated with the inspection based on the defect detection results.

These and other aspects of this disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings.

FIG. 4A is a block diagram of an example sub-system used for defect detection according to implementations of this disclosure.

FIG. 4B is an example of a technique for defect detection according to implementations of this disclosure.

DETAILED DESCRIPTION

Figure 1:
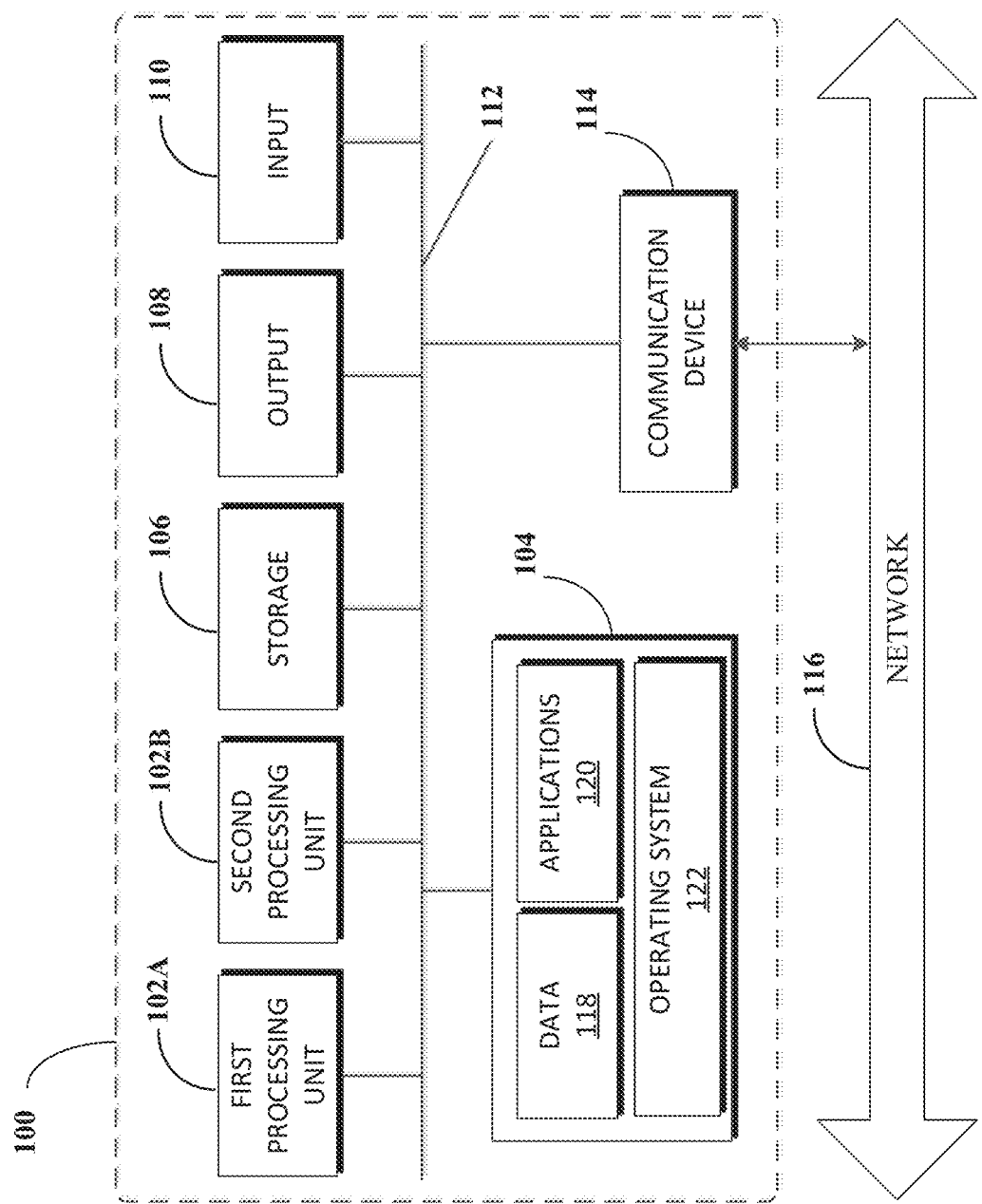
FIG. 1 is a block diagram of an example system used for defect detection according to implementations of this disclosure.

The manufacture of microchip devices continually strives for smaller sized elements to achieve higher density for integrated circuit (IC) designs on a target wafer. A wafer, also referred to as a substrate, is a thin slice of semiconductor material used for the fabrication of integrated circuits. For example, demand for 10 nanometer (nm) resolution and beyond now exists for features of logic circuits and arrays (e.g., finFETs, DRAMs, 3D NAND, etc.) in microchip semiconductor fabrication. The process of manufacturing integrated circuits (ICs) involves several phases, including a design phase, a manufacturing phase, and an inspection phase. During the inspection phase, ICs manufactured during the manufacturing phase are inspected for potential defects. The results of the inspection can be used to improve or adjust the design, the manufacturing, the inspection phases, and any combination thereof.

Detecting defects in such devices and/or defects of small sizes is a challenge in semiconductor manufacturing facilities. Conventional high throughput inspection systems (e.g., optical inspection systems) lack, for example, the resolution to find defects (e.g., physical defects) in manufactured devices. As such, optical inspection systems are not suitable for detecting defects with sizes below their optical resolutions. On the other hand, high-resolution inspection systems, such as a scanning electron microscope (electron beam, e-beam, or EBeam) system, can detect such defects. However, e-beam systems have low throughput. As such, the applicability and suitability of e-beam systems for production line (or inline) defect inspection of integrated circuits has been limited. For example, one week or more may be required to fully scan a single integrated circuit or die using an e-beam system. As such, e-beam systems have conventionally been used during the IC design process or in an off-line inspection and review process and not in inline production systems.

Inspecting an area of a wafer with an e-beam system typically includes generation of one or more recipe files. In this disclosure, "wafer" can refer to a wafer, a reticle, or any specimen to be inspected. In this disclosure, a recipe file (or "recipe") can be a set of one or more machine setup parameters, scan condition parameters (hereinafter, scan conditions), care area parameters (hereinafter, care areas) including care area coordinates, detection mode and other parameters to be used by the e-beam system for defect detection during an inspection process. A care area is an area on a wafer that is to be inspected for defects after fabrication. An operator, such as a human user or a computerized system, may prepare the recipe files. The recipe files are then transferred to a high-resolution inspection system including but not limited to an e-beam system (e.g., the recipe files are transferred to an e-beam system control computer of the e-beam system). The e-beam system then scans the wafer according to the recipe files.

The recipe files are not typically modified during the inspection process. When unexpected conditions are encountered during or after the inspection process, new recipe files are generated and transferred to the e-beam system to be used in subsequent inspections. Unexpected conditions include, but are not limited to, a previously undetected type of defect, a change to the scan conditions and/or inspection parameters in order to better capture defects, or e-beam system drift to an unknown or unexpected condition or state. As such, and in order to maximize the e-beam system usage, the user, performing an offline design analysis (i.e., offline to the production process), carefully prepares the recipe files for the manufacturing process under inspection and the user continuously monitors the inspection process in order to detect, identify, and adjust the recipe files to the unexpected conditions. The design analysis is performed offline at least for the reason that it is a time consuming process.

However, offline design analysis is inefficient, suboptimal, and has associated problems. For example, it may not be possible or practical to pre-determine or anticipate all possible process drifts that may occur during the manufacturing process and the impact of each drift on the integrated circuit design patterns. Also, as the design analysis is performed offline, the recipe files resulting from the design analysis, are generated and become available before inspection starts. As such, the recipe files remain static for the duration of an inspection and cannot be automatically adjusted as a result of defect detection results or receipt of machine data including but not limited to inspection machine condition parameters or scanning electron microscopy (SEM) images. Also, each wafer manufacturing process may require a process-specific design analysis. Such an analysis may be difficult to undertake when, for example, quantitative characterization of the manufacturing process is not available prior to preparing the recipe files for inspection. Machine data can include data that is used to characterize the conditions of various components of the inspection machine. For an e-beam system, the machine data can include but is not limited to the state of the column or secondary/back-scattered electron detectors, or the state of wafer stage drifting.

Preparing a list of care areas (that include potential defects) is a critical step in guided e-beam system inspection. The list of care areas can be obtained from, for example, the above-mentioned offline design analysis. The potential defects can be generated in a variety of ways including but not limited to using a hot spot prediction process and from prior knowledge of an operator. In addition, the offline design analysis can provide the sensitive IC design patterns which are prone to failure when manufactured under process variations (i.e., non-ideal manufacturing conditions). Care areas can then be generated from the sensitive IC design patterns. Alternatively, or in addition, care areas can be generated based on front-line inspection tools, such as an optical inspection system. A front-line inspection tool is a tool that is inline to and/or integrated in the production process and manufacturing line.

However, problems are also associated with the use of front-line tools. For example, maintaining two sets of tools (e.g., front-line inspection tools and the e-beam system) results in a higher cost of ownership for the manufacturing facility. The list of care areas is also subject to resolution limitations of front-line inspection tools. Additionally, and as mentioned above, the generated list of care areas is static during inspection by a high-resolution inspection system.

Methods and systems in accordance with the present disclosure can improve the inspection performance using an e-beam system via the dynamic updating of the inspection of integrated circuits. The term "dynamic" as used herein means that the recipe files, defect detection parameters, database that stores information associated with the inspection process, and any combination thereof are not static during the inspection process; rather, any of the recipe files, the defect detect parameters, and the database can be dynamically updated and/or changed based on results and inputs from the inspection process and system that includes a defect detection system and an e-beam system.

In the present disclosure, inspection machine data (e.g., inspection machine condition parameters and SEM images) of an e-beam system are continuously received and analyzed; as a result, the inspection process is continuously monitored and optimized. For example, recipe files are modified while the inspection process is ongoing to change the e-beam system set-up and scan condition in order to improve scan results and result in more accurate defect detection. Also, results from the defect detection (e.g., the results outputted from a defect detection software module or system coupled to or associated with the e-beam system) are inspected and the defect detection parameters utilized by the defect detection software, such as a threshold parameter (hereinafter, threshold) and a sensitivity parameter (hereinafter, sensitivity), are modified, based on the results of the defect detection, in order to improve defect detection performance. Information regarding scanned images from the e-beam system can be communicated to the defect detection software and, as necessary, the corresponding recipe files can be modified to improve the e-beam system scan parameter to produce images which are more friendly (i.e., optimized for usage) to the defect detection software. In addition, the defect detection results can be used to improve the performance of the hot spot prediction.

Implementations of this disclosure provide technological improvements to semiconductor manufacturing processes and computer systems, for example, those computer systems concerning the inspection of manufactured or fabricated semiconductor integrated circuits (ICs). For example, the present disclosure provides for continuous and dynamic updating of the inspection of integrated circuits by adapting the inspection process (e.g., via modification of the recipe files and defect detection parameters) during the inspection process itself based on machine data received from an e-beam system and defect detection results received from a defect detection system. Implementations of this disclosure can thus introduce new and efficient improvements in the ways in which integrated circuit are inspected for defects.

While the disclosure has been described in connection with certain embodiments and implementations, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Additionally, while this disclosure refers to an electron beam (e-beam or Ebeam) inspection/scanning machine and a high-resolution inspection/scanning machine, it is to be understood that the teachings herein can be implemented using any type of inspection machine including but not limited to a high-resolution inspection machine which may have low throughput. For example, the high-resolution inspection machine can be based on high-resolution optical inspection tools. For another example, the high-resolution inspection machine can be based on any of ultraviolet, extreme ultraviolet, X-ray, charged particles, and neutral particles.

To describe some implementations in greater detail, reference is made to the following figures.

FIG. 1 is a block diagram of a system 100 used for dynamic updating of the inspection of integrated circuits in accordance with the present disclosure. The system 100 can include an apparatus such as a computing device, which can be implemented by any configuration of one or more computers, such as a microcomputer, a mainframe computer, a super computer, a general-purpose computer, a special-purpose/dedicated computer, an integrated computer, a database computer, a remote server computer, a personal computer, or a computing service provided by a computing service provider, e.g., a web host, or a cloud service provider. In some implementations, the computing device can be implemented in the form of multiple groups of computers that are at different geographic locations and can or cannot communicate with one another, such as by way of a network. While certain operations can be shared by multiple computers, in some implementations, different computers are assigned different operations.

The system 100 can have an internal configuration of hardware including a first processing unit 102A, a second processing unit 102B, and a memory 104. The first processing unit 102A can include at least one processing unit such as a central processing unit (CPU) or any other type of device, or multiple devices, capable of manipulating or processing information now-existing or hereafter developed. The second processing unit 102B can include at least one graphics processing unit (GPU). Although the examples herein can be practiced with a single processing unit as shown, advantages in speed and efficiency can be achieved using more than one processing unit. For example, the first processing unit 102A and the second processing unit 102B can be distributed across multiple machines or devices (each machine or device having one or more of processing units) that can be coupled directly or across a local area or other network. The memory 104 can be a random access memory device (RAM), a read-only memory device (ROM), an optical disc, a magnetic disc, or any other suitable type of storage device. In some implementations, the memory 104 can be distributed across multiple machines or devices such as network-based memory or memory in multiple machines performing operations that can be described herein as being performed using a single computer or computing device for ease of explanation. In some implementations, the memory 104 can store codes and data that can be accessed by the first processing unit 102A and the second processing unit 102B using a bus 112. For example, the memory 104 can include data 118 that can be accessed by the first processing unit 102A and the second processing unit 102B using the bus 112.

The memory 104 can also include an operating system 122 and installed applications 120, the applications 120 including programs that permit the first processing unit 102A and the second processing unit 102B to implement instructions to generate control signals for performing functions of dynamic updating of the inspection of integrated circuits as described herein. The system 100 can also include a secondary, additional or storage 106, for example, a memory card, a flash drive, an external hard drive, an optical drive, or any other form of computer readable medium. In some implementations, the applications 120 can be stored in a whole or in part in the storage 106 and loaded into the memory 104 as needed for processing.

The system 100 can include one or more output devices, such as an output 108. The output 108 can be implemented in various ways, for example, it can be a display that can be coupled to the system 100 and configured to display a rendering of video data. The output 108 can be any device transmitting a visual, acoustic, or tactile signal to the user, such as a display, a touch sensitive device (e.g., a touch screen), a speaker, an earphone, a light-emitting diode (LED) indicator, or a vibration motor. If the output 108 is a display, for example, it can be a liquid crystal display (LCD), a cathode-ray tube (CRT), or any other output device capable of providing visible output to an individual. In some cases, an output device can also function as an input device—a touch screen display configured to receive touch-based input, for example.

The output 108 can alternatively or additionally be formed of a communication device for transmitting signals and/or data. For example, the output 108 can include a wired mean for transmitting signals or data from the system 100 to another device. For another example, the output 108 can include a wireless transmitter using a protocol compatible with a wireless receiver to transmit signals from the system 100 to another device.

The system 100 can include one or more input devices, such as an input 110. The input 110 can be implemented in various ways, such as a keyboard, a numerical keypad, a mouse, a microphone, a touch sensitive device (e.g., a touch screen), a sensor, or a gesture-sensitive input device. Any other type of input device, including an input device not requiring user intervention, is possible. For example, the input 110 can be a communication device such as a wireless receiver operating according to any wireless protocol for receiving signals. The input 110 can output signals or data, indicative of the inputs, to the system 100, e.g., along the bus 112.

Optionally, the system 100 can be in communication with another device using a communication device, such as a communication device 114, via a network, such as a network 116. The network 116 can be one or more communications networks of any suitable type in any combination, including, but not limited to, networks using Bluetooth communications, infrared communications, near field connections (NFC), wireless networks, wired networks, local area networks (LAN), wide area networks (WAN), virtual private network (VPN), cellular data networks and the Internet. The communication device 114 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the system 100 using the bus 112 to provide functions of communication with the network 116.

The system 100 can communicate with a wafer or reticle inspection equipment. For example, the system 100 can be coupled to one or more wafer or reticle inspection equipment, such as an e-beam system or an optical system, configured to generate wafer or reticle inspection results or receive instructions, such as via a recipe file, to perform inspection and scanning operations.

The system 100 (and algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of system 100 do not necessarily have to be implemented in the same manner.

In some implementations, the system 100 can be implemented using general purpose computers/processors with a computer program that, when executed, carries out any of the respective methods, algorithms and/or instructions described herein. In addition, or alternatively, for example, special purpose computers/processors can be utilized which can contain specialized hardware for carrying out any of the methods, algorithms, or instructions described herein.

Figure 2:
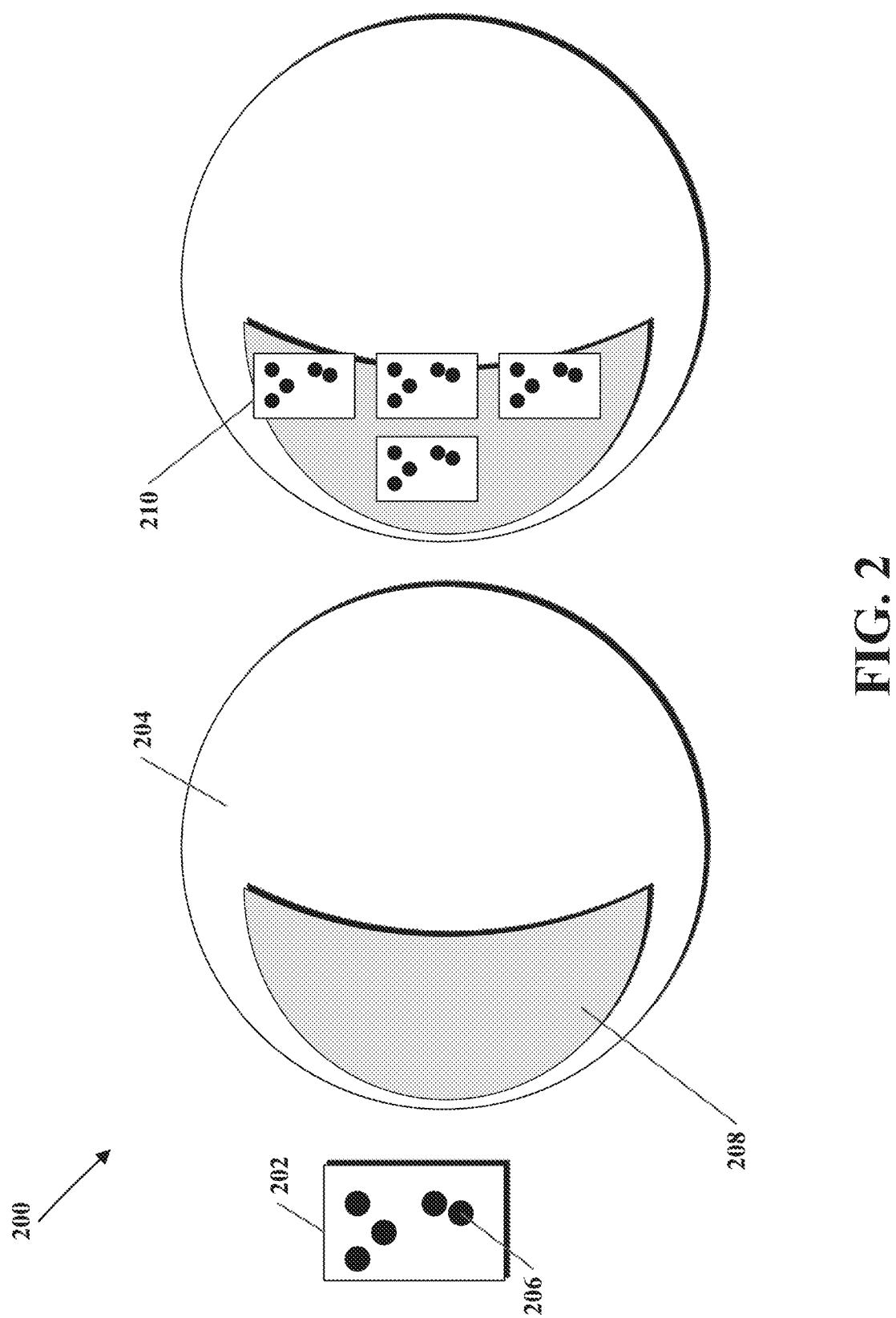
FIG. 2 is an example of an operation for defect inspection according to implementations of this disclosure.

FIG. 2 is an example of an operation 200 for defect inspection in accordance with the present disclosure. The operation 200 illustrates a manufacturing process and/or design process of an integrated circuit 202 (e.g., a die). The integrated circuit 202 is analyzed during the operation 200 to determine hot spots 206 (i.e., black circles on the integrated circuit 202 of FIG. 2). A hot spot relates to a design pattern which, when manufactured under undesirable or unexpected manufacturing process conditions (i.e., process condition variations or process variability), can render a die inoperable or result in an actual defect within the die that affects the overall performance of the die. Undesirable or unexpected manufacturing process conditions are manufacturing conditions that deviate from the ideal process conditions. ICs manufactured under ideal process conditions exhibit minimal or no defects.

In the operation 200, a wafer 204 under inspection by an inspection process is scanned by a high-resolution system including but not limited to an electron beam (e-beam) system to obtain or provide a process condition variation map. The process condition variation map is obtained by scanning the wafer 204 for certain pre-designed or pre-selected patterns and analyzing the high-resolution images via a set of computer instructions. The pre-designed or pre-selected patterns are IC design patterns which are suspected to be sensitive to process condition variations. In other words, the shapes of the pre-designed or pre-selected patterns on the wafer can change substantially when the manufacturing process experiences variations from ideal conditions. The pre-designed or pre-selected patterns can be selected based on prior knowledge (from information of an operator, information stored in a database, or information extracted using machine learning techniques) that the areas are sensitive to process condition variations. The pre-designed or pre-selected patterns can also be selected based on the chip designs of the integrated circuits being manufactured and inspected. Metrology or measurement results from these pre-designed or pre-selected patterns, obtained with an e-beam system, are then converted to process condition parameters. The process condition parameters can be used to generate one or more process condition variation maps. A process condition variation map indicates how different parts of a wafer may be affected by variations in the process conditions (e.g., variation in focus or dose). Variations in process conditions can result in defects in the manufactured dies.

In the operation 200, a process condition variation map reveals that an area 208 of the wafer 204 exhibits significant process condition variations. In another implementation, the area 208 represents the process condition variation map (and not just a subset of the process condition variation map) that has been determined via the operation 200. As such, the inspection process of the operation 200 only inspects certain dies (such as a die 210) of the wafer 204 for defects which is more efficient and less time-consuming than an inspection process that inspects the entire area of the wafer 204. The dies to be inspected for defects are those dies which are included in, or overlap with, the area 208. In another implementation, the dies that are inspected include dies that are within a predetermined area or distance of the area 208 even if they don't overlap with or are not enclosed within the area 208.

The hot spots of such dies may be determined upon further inspection to be true actual defects. Whether any of the hot spots of the die 210 is a true defect is determined by an inspection (e.g., additional scanning by the e-beam system). The hot spots of dies that are outside of, or not overlapping, the area 208 are not expected to result in actual defects and, therefore, do not have to be inspected. As described below, inspecting a hot spot means inspecting a care area that contains the hot spot. In an implementation, only care areas overlapping the area 208 are inspected. That is, instead of inspecting all the care areas of a die that is included in, or overlaps, the area 208, only the care areas inside the area 208 of those dies are inspected. While the area 208 is illustratively shown as a continuous area, this need not be the case. The shape of area 208 is not so limited and for example, can comprise various shapes separated by gaps or spaces.

In an implementation, the hot spots are assigned severity levels based upon various factors including but not limited to design features and the purpose or usage of the integrated circuits. The hot spots that are determined to have a high severity level and are thus deemed to be more important than hot spots with lower severity levels (e.g., hot spots that have high severity levels because they are near critical areas of the integrated circuit) are also scanned even if they do not fall within or overlap with the area 208. In other words, if dies that fall outside of the process condition variation map include hot spots that have been determined to have a high severity (e.g., a severity level that is greater than a predetermined threshold severity value) or importance level, they can also be scanned for actual defects.

As illustrated by the operation 200, an inspection method and system in accordance with the present disclosure significantly reduce wafer regions and dies to be inspected by a high-resolution inspection or e-beam system. Consequently, the time and cost required to inspect a manufactured wafer and the associated integrated circuits or dies is reduced and a low throughput, high resolution, e-beam scanning machine or device can be used for in-line inspection of the semiconductor manufacturing process.

The present disclosure can use various techniques to dynamically update the recipe files and software parameters during the inspection and defect detection process. The techniques can be based on pre-determined rules, statistics, or machine learning. For example, an operator, such as a user, can specify rules for updating the database, the recipe files, and the software parameters, or the various machine learning techniques. The various techniques can include a logistic regression technique, a support vector machine (SVM) technique, a neural network (NN) technique, a restricted Boltzmann machine (RBM) technique, or any combination thereof.

Figure 3:
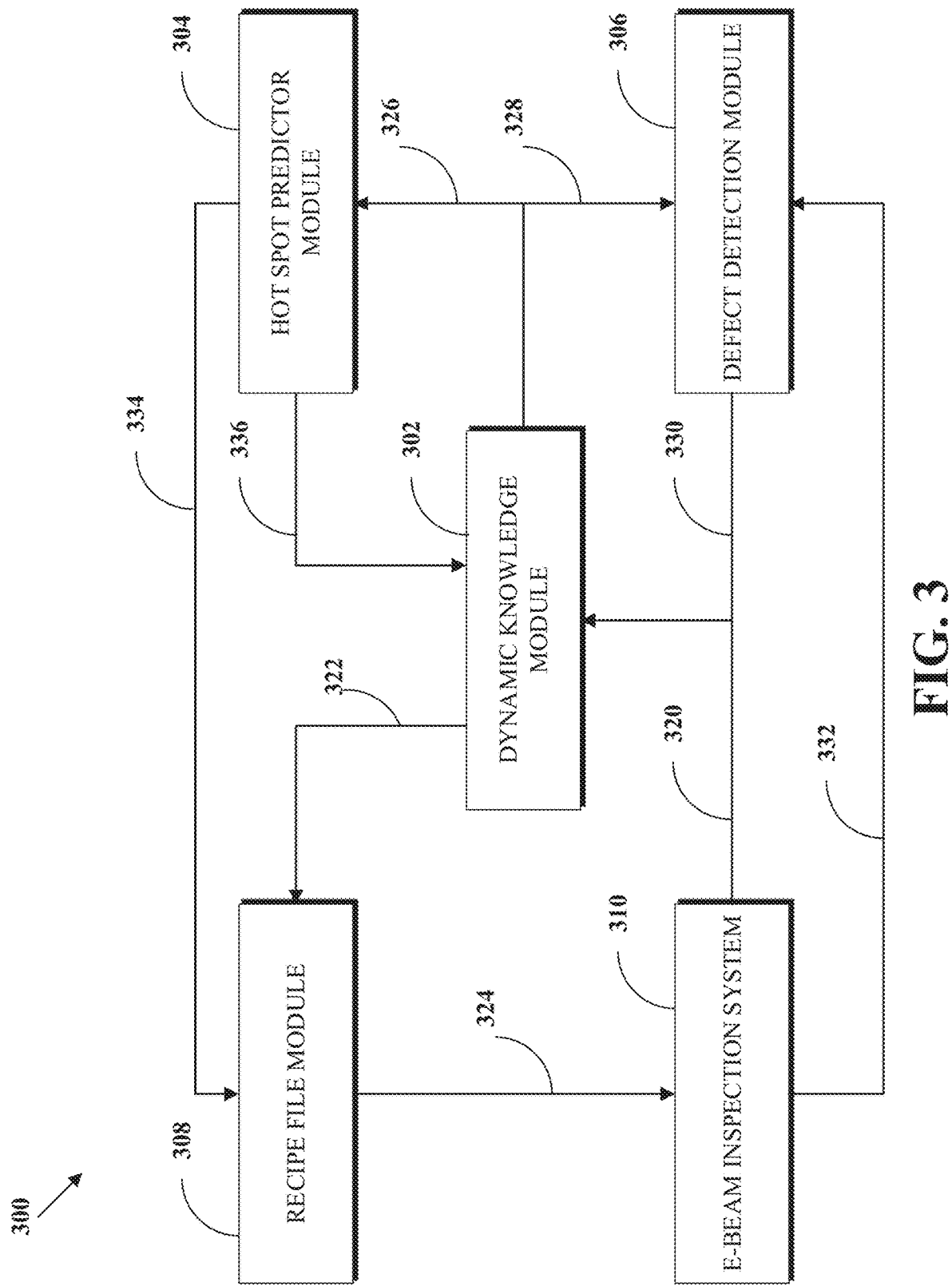
FIG. 3 is a block diagram of an example system used for providing dynamic updates for the inspection of integrated circuits according to implementations of this disclosure.

FIG. 3 is a block diagram of an example system 300 used for providing dynamic updates for the inspection of integrated circuits according to implementations of this disclosure. Aspects of the disclosure, e.g., operations or steps of techniques 450, 550, 550, 650, 750, and 800, and the method 900 of FIGS. 4B, 5B, 6B, 7B, 8, and 9, respectively, can be implemented as software and/or hardware modules in the system 300 of FIG. 3. For example, one or more apparatuses, such as the system 100 of FIG. 1, can implement one or more modules of the system 300. The apparatuses can be implemented by any configuration of one or more computers, such as a microcomputer, a mainframe computer, a super computer, a general-purpose computer, a special-purpose/dedicated computer, an integrated computer, a database computer, a remote server computer, a personal computer, or a computing service provided by a computing service provider, e.g., a web host, or a cloud service provider. In some implementations, the computing device can be implemented in the form of multiple groups of computers that are at different geographic locations.

The system 300 includes a dynamic database module 302, a hot spot predictor module 304, a defect detection module 306, a recipe file module 308, and an e-beam inspection system 310. The dynamic database module 302 can interact (e.g., to send or receive information and instructions) in a push, pull, or a combination thereof, fashion with any of the hot spot predictor module 304, the defect detection module 306, the recipe file module 308, and the e-beam inspection system 310.

The system 300 is dynamic as it can continuously and/or simultaneously modify recipe files, hot spot prediction parameters, and defect detection parameters during the inspection process (in real-time) in response to receiving data associated with the inspection process including but not limited to machine data (e.g., such as inspection machine condition parameters) from an e-beam system and/or defect detection results (e.g., whether a defect has been detected or not) from a defect detection system. The machine data can be data extracted from data directly received from the e-beam system. For example, process condition parameters can be derived or extracted based on an analysis of the SEM images. The system 300 continuously updates its knowledge of the defect detection results and the inspection results thereby improving each occurrence or run of the defect detection and the inspection processes. The system 300 updates its knowledge based on, for example, observable deviations from previous knowledge of the defect detection and the inspection processes. The knowledge can include stored historical results (from a current system being monitored and/or other systems), inferred data, and the like of defect detection and inspection.

Referring back to FIG. 3, in an implementation, the system 300 determines whether some parameters (e.g., based on the machine data from an e-beam system) and/or inspection information received at the dynamic database module 302, via the path 320, match previous (i.e., historical) knowledge that is based on previous inspections (also referred to as scan-related knowledge). If so, then the system 300 can send instructions based on the received parameters and/or inspection information, along the path 322 and via the recipe file module 308, to the e-beam inspection system 310, along the path 324, based on the received parameters, so that the e-beam inspection system 310 can more efficiently and accurately perform scanning operations.

For example, when new inspection machine condition parameters (i.e., the parameters received by the dynamic database module 302 from the e-beam inspection system 310 via the path 320) are determined to match previous inspection machine conditions parameters, no user intervention is required to generate new recipe files to vary the e-beam system 310 parameters (e.g., setup parameters or scan conditions); instead, the new parameters can be automatically set by the dynamic database module 302 of the system 300 via updated recipe files (i.e., the dynamic database module 302 sends instructions to the recipe file module 308 to update recipe files associated with the inspection process), along the path 322, based on parameters corresponding to the previous inspection machine condition parameters and stored in the system 300. In another implementation, instead of sending instructions, the dynamic database module 302 directly updates the recipe files associated with the inspection process.

In another implementation, even if a match between received parameters and/or inspection information and any previous parameters is not found or doesn't exist, the dynamic database module 302 of the system 300 can send instructions along the path 322 to update recipe files (via the recipe file module 308) or directly update the recipe files that are transmitted to and utilized by the e-beam inspection system 310 along the path 324 to improve the scanning done and carried out by the e-beam inspection system 310. In other words, the dynamic database module 302 provides instructions to update recipe files outputted from the recipe file module 308 and inputted into the e-beam inspection system 310 via the path 324. The recipe files can be stored in the dynamic database module 302. As such, the recipe file module 308 can update the recipe files in the dynamic database module 302.

In an implementation, the system 300 can send instructions, along the path 328 and via defect detection parameters, to the defect detection module 306 so that the defect detection module 306 can more efficiently and accurately perform defect detection operations. For example, based on the inspection information (including but not limited to SEM images) received from the e-beam inspection system 310 along the path 320 and by the dynamic database module 302, the dynamic database module 302 can send instructions to the defect detection module 306 to improve the defect detection process.

Throughout, "receive," "obtain" and like terms mean any way by which a method, a module, or a device can use the indicated information to carry out the functionality of the module or the steps of the method or device. Non limiting examples of "obtain" and "receive" include requesting information from another source, receiving the information from another source, requesting that another source generate or acquire the information, and retrieve from a data store, such as a database, etc.

The dynamic database module 302 can include a data store, such as a database or the storage 106 of FIG. 1, to transiently or permanently store results as described herein. The dynamic database module 302 continuously receives inspection data and machine data from the e-beam system 310 via the path 320. The inspection data can be SEM images of the integrated circuits and underlying wafer being inspected/scanned. Using the inspection data, the dynamic database module 302 monitors the inspection process to determine, for example, process condition parameters, which can be used by the hot spot predictor module 304. For example, the dynamic database module 302 can store hot spots associated with particular process conditions. The system 300 can use these hot spots to generate care areas when inspecting the same or similar designs as the hot spots under the same or similar process condition. For example, when inspecting the same design, the system 300 can look-up the hot spots based on the design to generate the care areas. In another example, when inspecting similar designs, the system 300 can perform a pattern-matching search based on the designs to find matching hot spots and generate care areas.

The dynamic database module 302 also receives defect detection data from the defect detection module 306, via the path 330. The dynamic database module 302 can modify, or direct the defect detection module 306 to modify, via the path 328 and using the defect detection data, software parameters related to defect detection. The software parameters can include but are not limited to threshold and sensitivity (i.e., tolerance) values as further described below.

The dynamic database module 302 can include, for example, a list of hot spots, reference designs of integrated circuit designs, and IC design patterns sensitive to process variations. Information about each hot spot includes, but is not limited to, a size (e.g., 13 nanometers nm, 15 nm, 10 nm), a material type (e.g., metal), and whether the hot spot corresponds to a substrate contact or a metal contact. Implementations of the system 300 can allow a manufacturer, e.g., a foundry, to define what information is to be maintained and continuously updated in the dynamic database module 302.

The list of hot spots can be indicative of defects of interest or potential defects. A defect of interest can be identified by a design engineer based on knowledge that a design pattern may exhibit defects during the manufacturing process. Alternatively, or in addition, a defect of interest can be identified based on design patterns identified as important or crucial to the functioning of the integrated circuit. For example, to ensure that an overlay area of contacts between multiple layers of an integrated design is large enough such that contact is effectuated so as to not impact the functioning of the manufactured integrated circuit, the contact design pattern can be identified as a defect of interest. A defect of interest can be identified by a process engineer with knowledge, from previous process development, that a certain design pattern may exhibit defects or failures during manufacturing. The process engineer can identify the pattern as a defect of interest so that the system 300 can monitor the inspection of the manufactured integrated circuits to ensure that the defect of interest is not a defect (i.e., an actual defect) in the manufactured die or integrated circuit. A defect of interest can also be identified as a result of defect detection by the defect detection module 306. Defects of interest can be identified in other ways and by other means.

In an implementation, a foundry that manufactures integrated circuits for a first customer and a second customer can have accumulated, in the dynamic database module 302, lists of known or predetermined hot spots for each of the first and second customers. Each of the hot spots can be identified with or associated with a layer of manufacture of the integrated circuit. As such, when the foundry undertakes a new manufacturing process for the first customer, the dynamic database module 302 can generate a list of previously known hot spots from the dynamic database module 302 in order to generate care areas for the layer under manufacturing and subsequent inspection.

For example, the hot spot predictor module 304 can use the defect of interest information from the dynamic database module 302, along the path 326, to generate care areas. Inspecting, done by the e-beam inspection system 310 and based on the generated care areas, may uncover previously unknown defects that comprise the inspection data inputted into the defect detection module 306 via the path 332. As such, the list of hot spots for the first customer is updated in the dynamic database module 302, via the path 330, to include the previously unknown defects. Alternatively, or in addition, the defect detection module 306 provides defect-related knowledge related to the previously unknown defects to the dynamic knowledge module 302 via the path 330. The hot spot predictor module 304 can, or the dynamic knowledge module 302 can have the hot spot predictor module 304, update the list of hot spots for the first customer in the dynamic database module 302 based on the defect-related knowledge. Pattern data associated with the previously unknown defect can also be provided to the dynamic database module 302 via the path 330.

The dynamic database module 302 can include information regarding IC design patterns known to be sensitive to process variations as described with respect to FIG. 2. Sensitive patterns are such that the shapes of such patterns on a wafer can change substantially when the manufacturing process experiences variations from ideal conditions. Process variations can include focus variations and dose variations of the manufacturing process. Process variations can result, for example, in thickness variations, pattern defects, wrongly sized patterns, and like defects in a manufactured IC.

When undertaking a new inspection process for a chip design, the system 300 can identify sensitive patterns in the chip design via, for example, pattern matching. The pattern matching can identify that the chip design is similar to one previously inspected or that the chip design includes similar designs to one previously inspected. The system 300, such as via the hot spot predictor module 304, can generate a list of care areas for inspection which can be inputted into the recipe file module 308 along the path 334. Alternatively, the hot spot predictor module 304 provides the list of care areas to the dynamic knowledge module via path 336 which are then inputted into the recipe module 308 along the path 322. The recipe file module 308 can update the recipe files for the e-beam system 310 based on the received hot spot information. Accordingly, the number of care areas to be inspected may be reduced. Reducing the number of inspections of care areas effectively increases the throughput the e-beam inspection system 310 as a wafer can be inspected more quickly and more inspections can be performed in the same amount of time. The care area information or the hot spot information can be communicated from the hot spot predictor module 304 to the recipe file module 308 via the path 334, or alternatively, via the dynamic database module 302 and along the path 322.

The hot spot predictor module 304 generates, from the hot spots maintained by the dynamic database module 302, care areas for the e-beam inspection system 310. As described above, a care area is an area of interest on a wafer which contains potential defects and, therefore, will be inspected to determine whether the potential defects are real or actual defects. If the dynamic database module 302 determines, after several inspection cycles, that a predicted hot spot is not a hot spot (i.e., that no defect corresponding to the hot spot was detected), then the hot spot predictor module 304 or, alternatively, the dynamic database module 302 can update the hot spot information maintained by the dynamic database module 302 to indicate that the hot spot is not a hot spot for the wafer under inspection, for the design under manufacturing, or both. For example, if the defect detection module 306 determines that no defect corresponding to a hot spot was found in the last number of scans (e.g., the last 10 scans), then the hot spot can be removed from the list of hot spots to be inspected in subsequent inspections by the e-beam inspection system 310.

The defect detection module 306 processes SEM images generated by and received from the e-beam inspection system 310 and reports defects to the dynamic database module 302. The SEM images can be received directly from the e-beam system 310 along the path 332. Alternatively, or in addition, the SEM images are first received by the dynamic database module 302 along the path 320 and then received by the defect detection module 306 along the path 328. The defect detection module 306 can also obtain, along the path 328, optimized defect detection parameters from the dynamic database module 302.

In an implementation, the defect detection module 306 can compare a SEM image from a die under inspection (i.e., an inspection SEM image) to a corresponding SEM image from another die on the same wafer or from another wafer. Alternatively, the defect detection module 306 can compare the SEM image to the SEM image of a reference die. SEM images can be noisy which can result in differences between the compared images. The difference is known as "sensitivity." When the defect detection module 306 subtracts a reference SEM image from the inspection SEM image, the non-zero difference will either be noise or indicative of a defect. In order to differentiate noise from true defects, the defect detection module 306 compares the difference to a threshold or a sensitivity value. For example, if the difference is smaller than a predetermined amount, then the difference is marked as noise; otherwise, the difference is marked as a defect.

Determining a difference between a reference SEM image and an inspection SEM image can be based on SEM image pixel value differences. For example, the pixel values of a SEM image can be represented by 8-bit integer values (however, any pixel depth is possible). As such, a pixel of a SEM image can have a value in the range 0-255. The reference SEM image can be subtracted (e.g., pixel wise) from the inspection SEM image resulting in pixel-wise differences. Locations in an inspection SEM image where pixel-wise differences (e.g., the absolute value of the difference) exceed a predetermined amount (e.g., a threshold or a sensitivity value) can be identified as potential defects (i.e., the difference is marked as a defect). Pixel-wise differences that do not exceed the predetermined amount can be considered noise.

In an implementation, the pixel-wise differences can be normalized before being compared to the predetermined amount. Any normalization technique can be used. For example, the normalization can be based on an image noise level. The image noise level can be a metric (e.g., the average, the standard deviation, or a combination thereof) related to the pixel-wise differences. The image noise level can be used as the threshold. Pixel-wise differences, including pixel-wise differences of pixels in more noisy regions and in less noisy regions of the inspection SIM image, can be compared to threshold.

Determining an optimal value for the sensitivity is often determined empirically. As such, by continually updating its knowledge of defect detection, the system 300 can converge to the optimal threshold values. The optimal values are stored by the dynamic database module 302 as part of defect detection-related knowledge and are communicated to the defect detection module 306 along the path 328 to continuously improve the defect detection process.

In another implementation, the defect detection module 306 can compare a SEM image of the die under inspection to the design file of the integrated circuit, such as by comparing the SEM image to a GDS design file. The GDS design file contains, for example, sharp edges for design patterns. However, SEM images, obtained by scanning the actual shapes of the integrated circuits on the wafer, may not contain sharp edges. Therefore, the differences between the SEM image and the design file may be greater than zero. As such, tolerance values (also referred to as "sensitivity" values) can be used to differentiate true defects from noise. Optimal tolerance values, as with the threshold values indicated above, are difficult to determine. As such, by continually updating its knowledge of defect detection, the system 300 can converge to the optimal sensitivity values. The optimal sensitivity values are also included in the defect detection-related knowledge which are communicated to the defect detection module 306 along the path 328 to continuously improve the defect detection process.

When defect detection parameters, such as the threshold values and sensitivity values, are available in the dynamic database module 302, no intervention/setup or at least a very minimal amount of intervention/setup, such as by a user operator, is required for the defect detection module 306. The defect detection module 306 can obtain these values from the dynamic database module 302, via the path 328, when executing defect detection based on SEM images obtained from the e-beam inspection system 310.

For example, when the defect detection module 306 performs an edge placement error (EPE) measurement, it obtains an EPE threshold from the dynamic database module 302, via the path 328. Assuming the dynamic database module 302 provided a value of 5 nm, then the defect detection module 306 flags an EPE measurement that is greater than 5 nm as a defect; otherwise the measurement is not flagged as a defect. The defect detection module 306 provides the measurement result to the dynamic database module 302, via the path 330, to update the defect detection-related knowledge of the dynamic database module 302.

A recipe file of care areas may be generated from knowledge (i.e., data/information stored) in the dynamic database module 302. The recipe file module 308 generates recipe files based on information obtained from the dynamic database module 302. A recipe file is the collection of files and configuration used to instruct the e-beam inspection system 310 to perform inspection or scanning operations.

The e-beam inspection system 310 generates or provides SEM images of a die based on at least one of the recipe files. The defect detection module 306 identifies defects in the SEM images. If the dynamic database module 302 determines, for example, that an unexpectedly high number of defects (e.g., greater than a threshold value of expected defects) were uncovered, the dynamic database module 302 can determine that the e-beam inspection system 310 setup parameters (i.e., via the recipe file) were improper or inaccurate. The dynamic database module 302 can scan its previous knowledge (i.e., e-beam scan-related knowledge) of similar defects or the related scan parameters and update the recipe file with more appropriate scan parameters.

In a scanned area, and instead of or in addition to a predicted place, the defect detection module 306 may detect a new defect in another place of the scanned area. The dynamic database module 302 can update the defect detection-related knowledge such that the new defect is inspected for in a subsequent inspection. That is, the dynamic database module 302, via the path 322, accordingly updates or causes the recipe file module 308 to update the recipe file.

The updated recipe file is used in subsequent inspections as part of the continuously monitored manufacturing process and the ongoing inspection process. A subsequent inspection may be a subsequent inspection of another care area of the same die, an inspection of another die of the same wafer, an inspection of another wafer from the same lot of wafers, or an inspection of a different lot of wafers.

In some cases, the dynamic database module 302 may determine, based on the new defect, that the same scanned area is to be rescanned. In such a case, the dynamic database module 302 can instruct the recipe file module 308 or provide a direct instruction (or, the recipe file module 308 may determine) to generate a new recipe file to be provided to the e-beam inspection system 310 which will re-scan the scanned area.

Sub-systems of the system 300 of FIG. 3 and techniques implemented by the sub-systems are now described with reference to FIGS. 4A-4B, 5A-5B, 6A-6B, and 7A-7B. The sub-systems comprise various combinations of the modules included in the system 300. In the following description, a reference to a module performing an action or an operation via a step of a technique should be understood as the technique executing executable instructions corresponding to the step in relation to the referenced module.

FIG. 4A is a block diagram of an example sub-system 400 used for defect detection according to implementations of this disclosure. The sub-system 400 of FIG. 4A includes the e-beam inspection system 310, the defect detection module 306, and dynamic knowledge module 302 of FIG. 3. The sub-system 400 includes instructions or have corresponding instructions that, when executed, perform the steps of FIG. 4B.

FIG. 4B is an example of a technique 450 for defect detection according to implementations of this disclosure. The technique 450 can be carried out by instructions stored in or in connection with the modules of the sub-system 400. The e-beam inspection system 310 scans a wafer, via operation 452, for potential defects thereby generating or providing SEM images. The defect detection module 306, via the operation 454, processes the SEM images to detect defects as described above with respect to FIG. 3. The defect detection module 306 then reports the defects to the dynamic database module 302. The dynamic database module 302, via step 456, determines defect detection-related knowledge based on the reported defects, and stores the defect-related knowledge in a database, such as a database associated with the dynamic database module 302.

The dynamic database module 302 can use the defect-related knowledge to set (i.e., change, update, evolve, etc.) defect detection software parameters, such as a threshold or sensitivity, as described with respect to FIG. 3. As such, the dynamic database module 302 can evolve (i.e., improve the inspecting integrated circuits over time) with the process of defect detection by receiving and utilizing feedback based on the defect detection results generated by the defect detection module 306. Additionally, the defect detection module 306, via operation 454, can obtain from the dynamic database module 302 optimized defect detection parameters to improve the defect detection process.

Figure 5A:
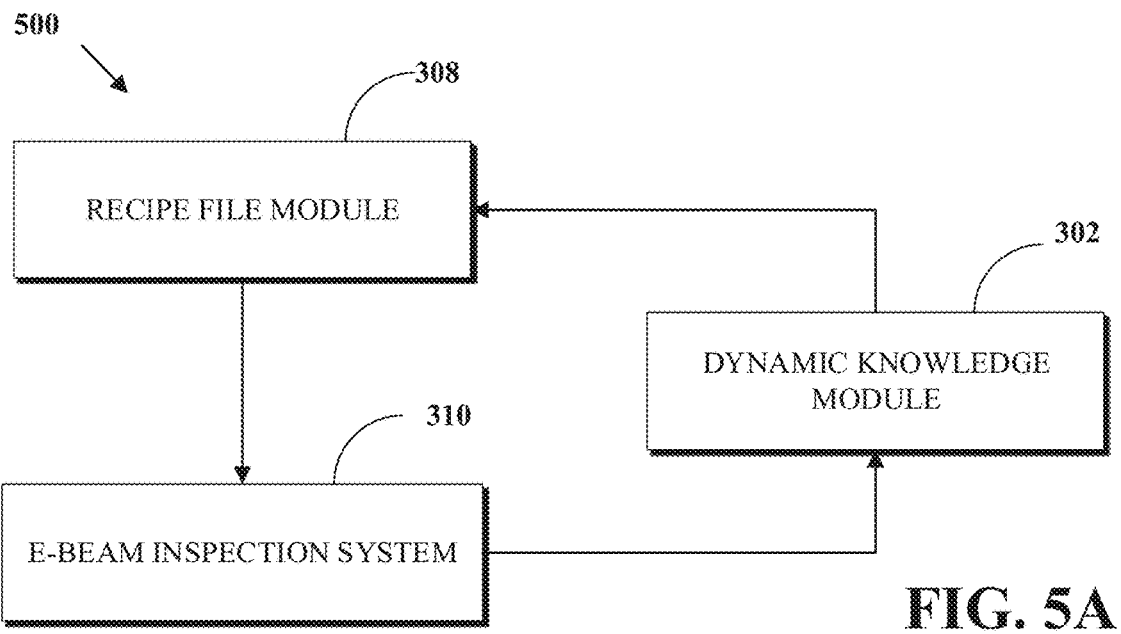
FIG. 5A is a block diagram of an example sub-system used for e-beam inspection according to implementations of this disclosure.

FIG. 5A is a block diagram of an example sub-system 500 used for e-beam inspection according to implementations of this disclosure. The sub-system 500 of FIG. 5A includes the recipe file module 308, the e-beam inspection system 310, and the dynamic database module 302 of FIG. 3. The sub-system 500 includes instructions or have corresponding instructions that, when executed, perform the steps of FIG. 5B.

Figure 5B:
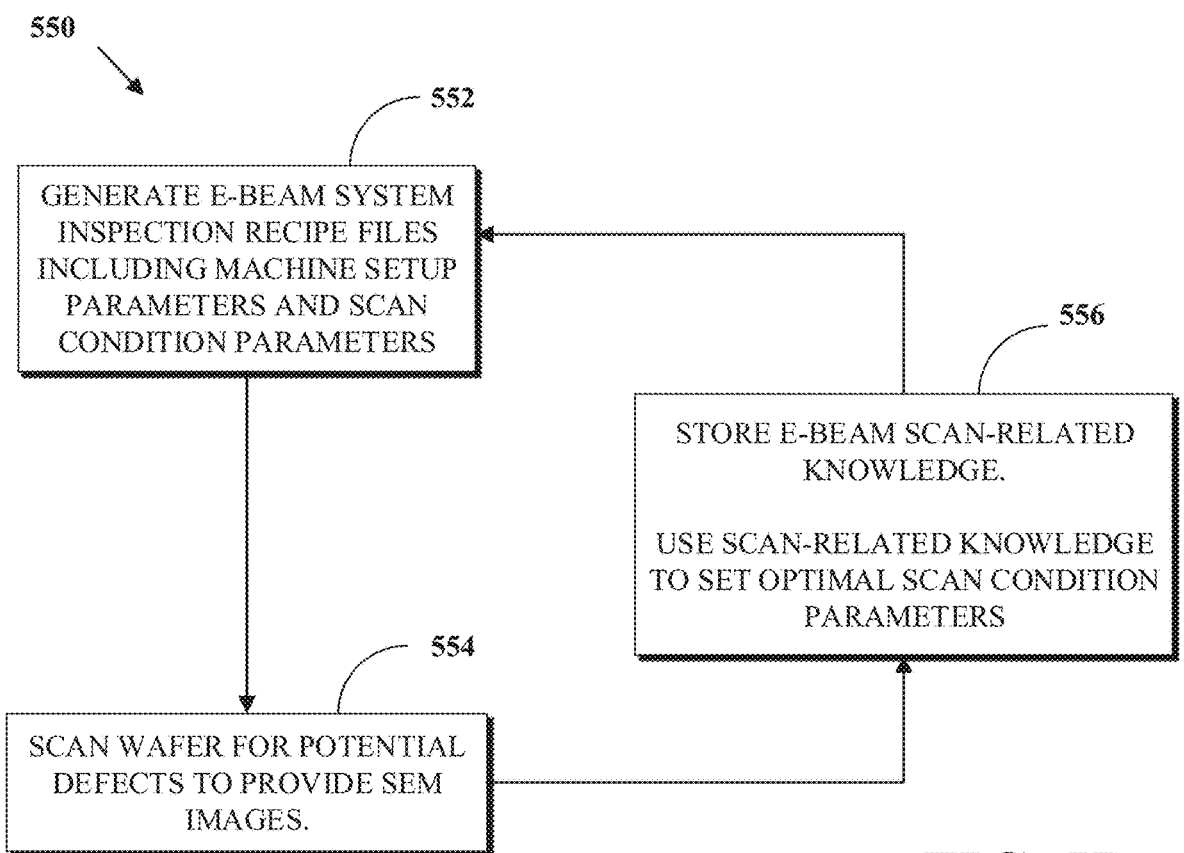
FIG. 5B is an example of a technique for e-beam inspection according to implementations of this disclosure.

FIG. 5B is an example of a technique 550 for e-beam inspection according to implementations of this disclosure. The technique 550 can be carried out by instructions stored in or in connection with the sub-system 500. The recipe file module 308 generates, via operation 552, recipe files for the e-beam inspection system 310. The recipe files include machine setup parameters and scan condition parameters which can be obtained from an operator of the inspection processor or the dynamic database module 302. The machine setup parameters and scan condition parameters are constantly updated by the dynamic database module 302 enabling the inspection process conducted by the e-beam inspection system 310 to operate under more optimal conditions.

The e-beam inspection system 310, via operation 554, scans a wafer for potential defects, using the recipe files generated by the operation 552, to provide SEM images. The dynamic database module 302, via operation 556, stores e-beam scan-related knowledge. The scan-related knowledge can include but are not limited to the SEM images and inspection machine condition parameters. Using the scan-related knowledge, the recipe file module 308 can generate subsequent recipe files (or update current recipe files) with optimized parameters thereby improving the scan performance of the inspection by the e-beam inspection system 310.

Inspection machine condition parameters can describe the states of the various components of the inspection machine. For example, during a continuous scan, the wafer stage coordinates can have a systematic shift compared to the wafer coordinates. The systematic shift can be an example of scan-related knowledge. The shift can be corrected by re-calibrating the relationship between the wafer stage coordinates and the wafer coordinates. However, recipe files that take the shift into account (i.e., correct for the shift) can be generated by a system that provides dynamic updates for the inspection of integrated circuits, such as the system 300 of FIG. 3. As a result, the continuous scan is not disrupted (i.e., stopped) in order to perform coordinate calibration.

Figure 6A:
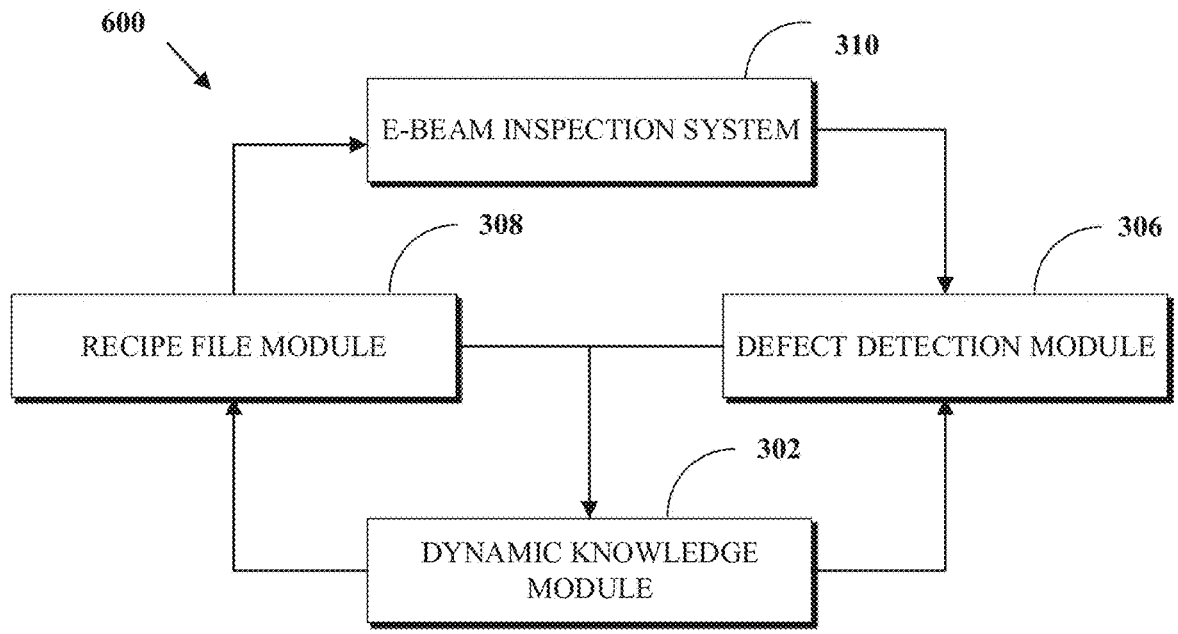
FIG. 6A is a block diagram of an example sub-system used for e-beam inspection and defect detection according to implementations of this disclosure.

FIG. 6A is a block diagram of an example sub-system 600 for e-beam inspection and defect detection according to implementations of this disclosure. The sub-system 600 of FIG. 6A includes the dynamic database module 302, the defect detection module 306, the recipe file module 308, and the e-beam inspection system 310 of FIG. 3. The sub-system 600 includes instructions or have corresponding instructions that, when executed, perform the steps of FIG. 6B.

Figure 6B:
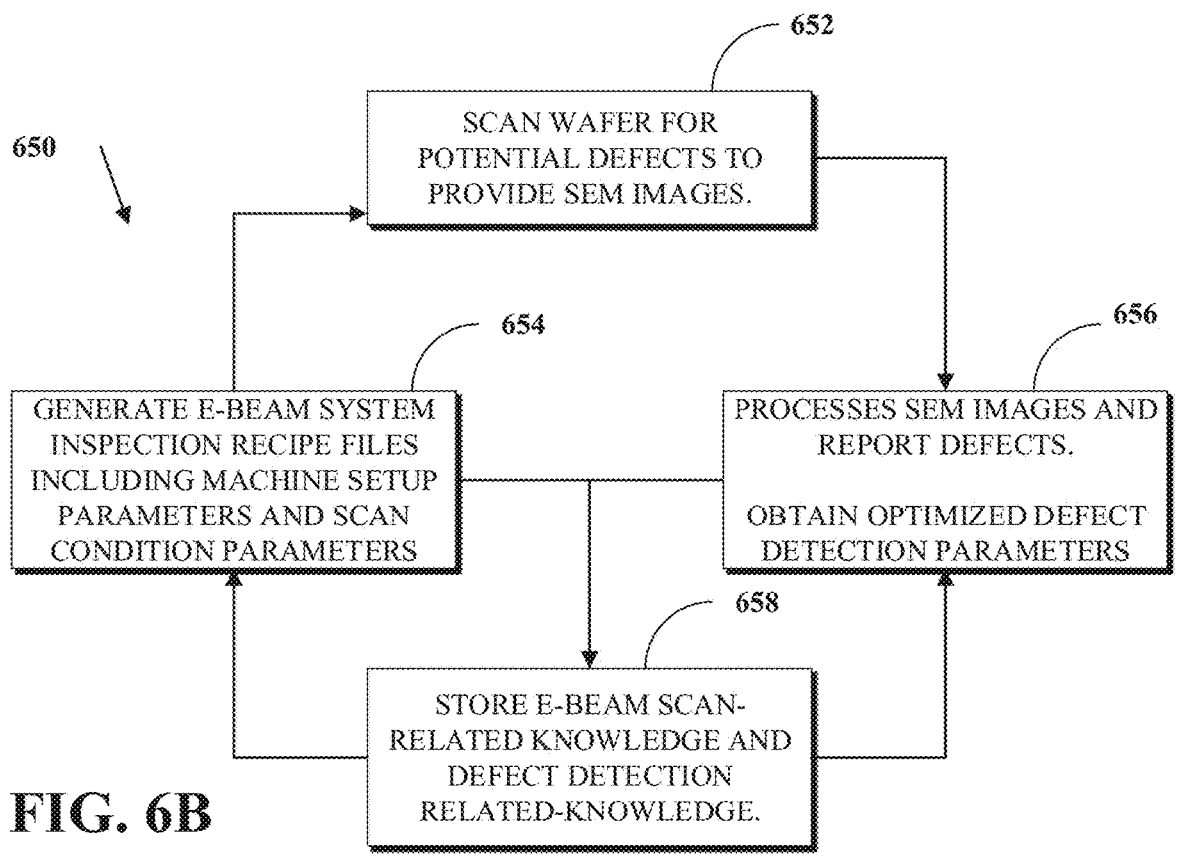
FIG. 6B is an example of a technique for e-beam inspection and defect detection according to implementations of this disclosure.

FIG. 6B is an example of a technique 650 for e-beam inspection and defect detection according to implementations of this disclosure. The technique 650 can be carried out by instructions stored in or in connection with the sub-system 600. The e-beam inspection system 310, via operation 652, scans wafers for potential defects and generates or provides SEM images based on the scans. The defect detection module 306, via operation 656, processes the SEM images and reports defects to the dynamic database module 302. The technique 650 can perform the operation 656 as explained above with respect to the operation 454 of FIG. 4B.

The recipe file module 308 generates, via operation 654, recipe files for the e-beam inspection system 310. The recipe files include machine setup parameters and scan condition parameters which are obtained from the dynamic database module 302. The technique 650 can perform the operation 654 as explained above with respect to the operation 552 of FIG. 5B.

The dynamic database module 302, via operation 658, stores e-beam system scan-related knowledge and defect detection-related knowledge. To store the scan-related knowledge, the technique 650 can perform the operation 658 in accordance with the operation 556 of FIG. 5B. To store the defect detection-related knowledge, the technique 650 can perform the operation 658 in accordance with the operation 456 of FIG. 4B.

Figure 7A:
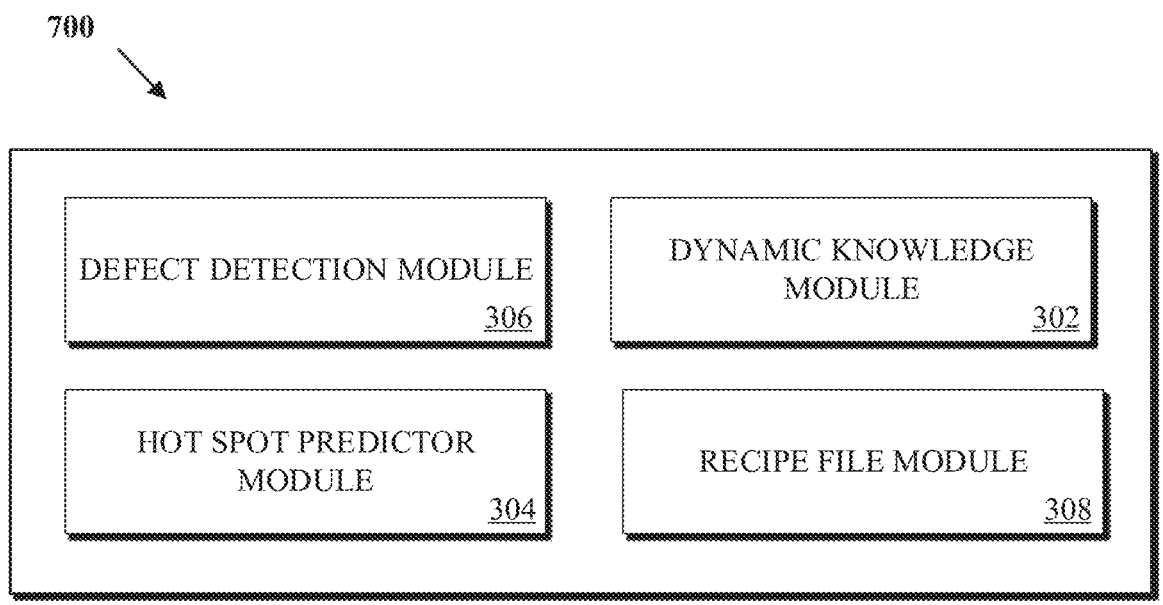
FIG. 7A is a block diagram of an example sub-system used for full chip hot spot prediction and care area generation according to implementations of this disclosure.

FIG. 7A is a block diagram of an example sub-system 700 used for full chip hot spot prediction and care area generation according to implementations of this disclosure. The sub-system 700 of FIG. 7A includes the dynamic database module 302, the hot spot predictor module 304, the defect detection module 306, and the recipe file module 308 of FIG. 3. The sub-system 700 includes instructions or have corresponding instructions that, when executed, perform the steps of FIG. 7B.

Figure 7B:
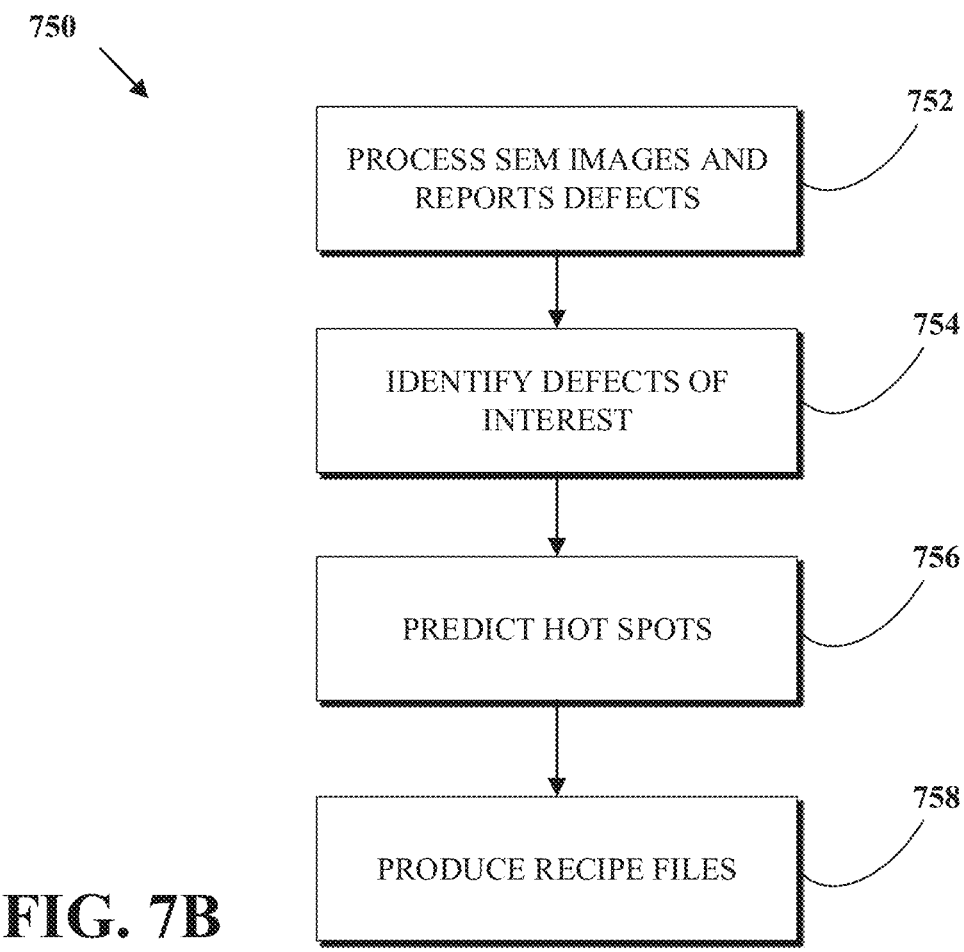
FIG. 7B is an example of a technique for full chip hot spot prediction and care area generation according to implementations of this disclosure.

FIG. 7B is an example of a technique 750 for full chip hot spot prediction and care area generation according to implementations of this disclosure. The technique 750 can be carried out by instructions stored in or in connection with the modules of FIG. 7A. The defect detection module 306, via operation 752, processes SEM images and reports defects (i.e., detects the presence of defects in the integrated circuits based on analyzing the SEM images). The technique 750 can perform the operation 752 in accordance with the operation 454 of FIG. 4B. The dynamic database module 302, via operation 754, can identify defects of interest based on the defects reported by the defect detection module 306. The defect detection-related knowledge of the dynamic database module 302 can be updated with knowledge based on the defects of interest. Defects of interest stored in the dynamic database module 302 are used by the recipe file module 308 to generate care areas for subsequent inspection by, e.g., the e-beam inspection system 310.

The hot spot predictor module 304, via operation 756, uses the defects of interest of the dynamic database module 302 to produce a list of care areas of interest that contain potential defects and, as such, are to be inspected. The recipe file module 308, via operation 758, uses the list of care areas of interest to generate recipe files to be used by the e-beam system 310 to scan a wafer, as explained with respect to operation 452 of FIG. 4.

Figure 8:
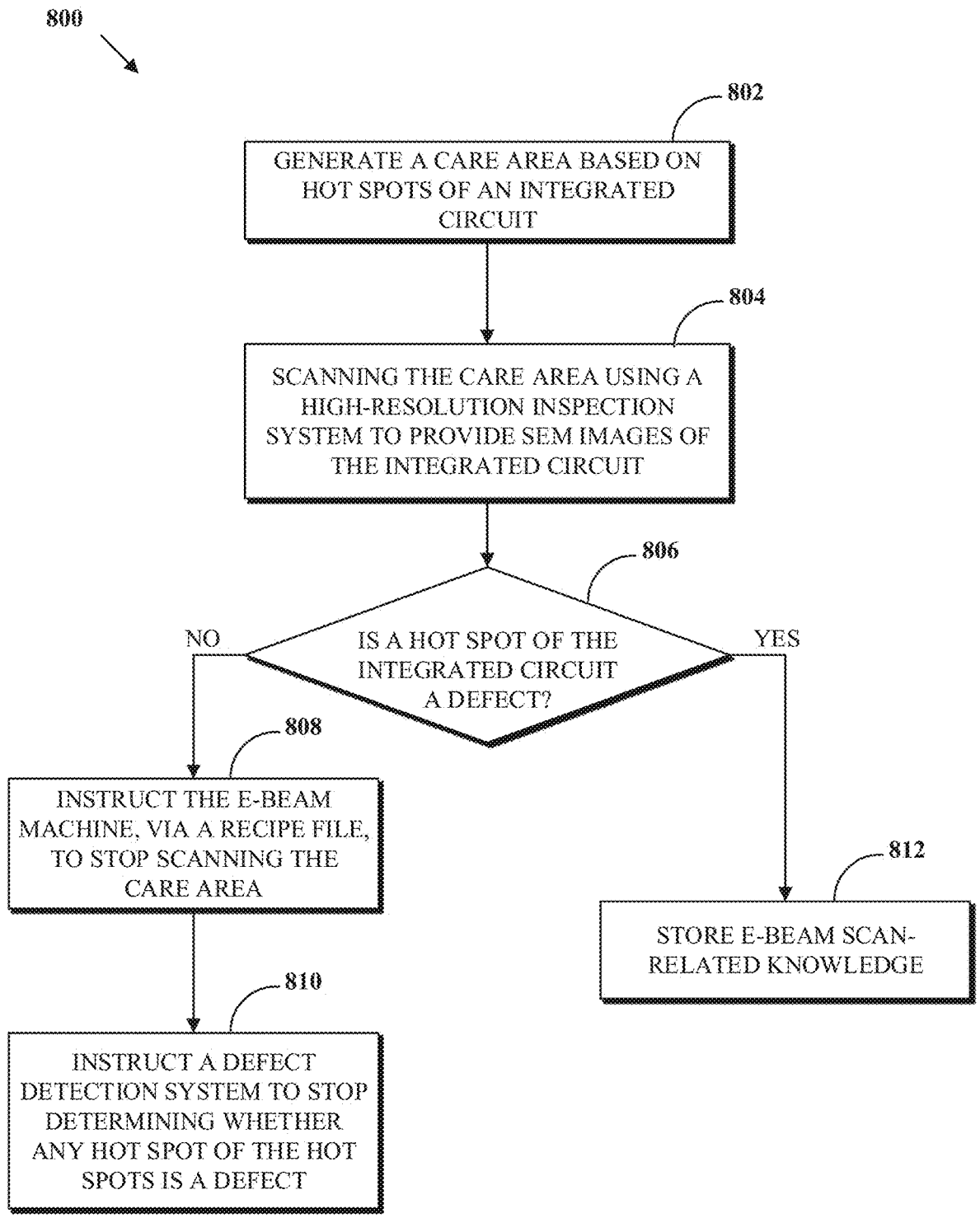
FIG. 8 is an example of a technique for dynamically updating recipe files for e-beam inspection according to implementations of this disclosure.

FIG. 8 is an example of a technique 800 for dynamically updating recipe files for e-beam inspection according to implementations of this disclosure. The technique 800 generates a care area based on hot spots (e.g., hot spots predicted by the hot spot predictor module 304 of FIG. 3) of an integrated circuit, via operation 802, and scans the care area using a high-resolution inspection system (e.g., an e-beam inspection system such as the e-beam inspection system 310 of FIG. 3) to generate/provide SEM images of the integrated circuit, via operation 804. At operation 806, the technique 800 determines whether a hot spot (i.e., a potential defect) of the integrated circuit is a defect (i.e., an actual or true defect) using the results of the scanning process of operation 802; if not (i.e., the potential defect is not an actual defect), then the technique 800 proceeds to operation 808, otherwise the technique 800 determines that an actual defect has been identified and, at operation 812, stores (e.g., updates) the e-beam scan-related knowledge with this information.

The technique 800, via operation 808, instructs the high-resolution inspection system, by updating a recipe file, to stop scanning care areas related to the hot spot. At operation 810, the technique 800 instructs a defect detection system to stop determining whether the hot spot is a defect. In an implementation, the determination is made based on a predetermined number of scans of the care area.

In an implementation, the technique 800 includes identifying a new defect in an image of the electron microscope images where the new defect is not related to or one of the hot spots of the integrated circuit, identifying a design pattern for the new defect, determining occurrences of the design pattern in a layout file of the integrated circuit, and modifying the recipe file based on the occurrences of the design pattern. Identifying a new defect in an image of the electron microscope images can be based on design layout files of the integrated circuit. Pattern matching can be used to determine the occurrences of the design pattern in a layout file. The identifying of the new defect can be further based on a threshold value or a sensitivity value.

Figure 9:
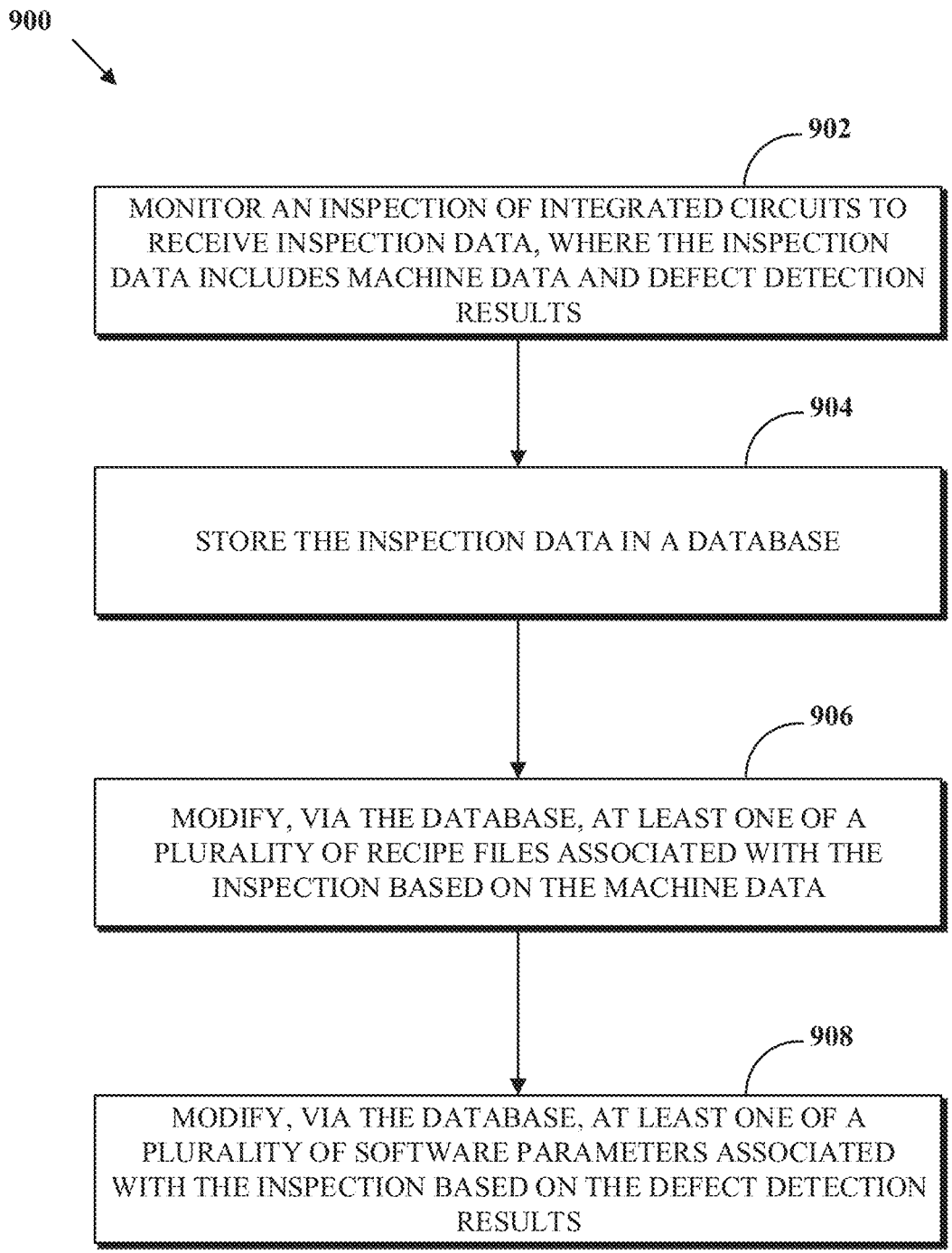
FIG. 9 is a method for inspecting integrated circuits according to an implementation of this disclosure.

FIG. 9 is a method 900 for inspecting integrated circuits according to implementations of this disclosure. The method 900 includes monitoring an inspection of integrated circuits to receive inspection data which includes machine data and defect detection results, via step 902, storing the inspection data in a database, via step 904, modifying, via the database, at least one of a plurality of recipe files associated with the inspection based on the machine data, via step 906, and modifying, via the database, at least one of a plurality of software parameters associated with the inspection based on the defect detection results, via step 908. The database can be a dynamic database module, such as the dynamic database module 302 of FIG. 3.

In an implementation, the machine data includes any of inspection machine condition parameters and scanning electron microscope (SEM) images. In an implementation, modifying at least one of a plurality of recipe files associated with the inspection based on the machine data includes, in response to variations in the inspection machine condition parameters, modifying, via the database, any of a machine setup parameter and a scan condition parameter of the at least one of the plurality of recipe files to improve scan performance of the inspection. In an implementation, modifying at least one of the plurality of recipe files associated with the inspection based on the machine data includes, in response to inspecting the SEM images, modifying a scan condition parameter of the at least one of the plurality of recipe files to improve SEM image generation.

In an implementation, modifying at least one of a plurality of software parameters associated with the inspection based on the defect detection results includes, in response to inspecting the defect detection results, modifying, via the database, any of a threshold parameter and a sensitivity parameter of the at least one of the plurality of software parameters to improve defect detection of the inspection. In an implementation, the technique 900 includes, in response to detecting a new defect of interest during the inspection, updating the database with pattern data associated with the new defect of interest.

In an implementation, modifying at least one of a plurality of software parameters associated with the inspection based on the defect detection results includes, in response to inspecting the defect detection results, modifying, via the database, any of a threshold parameter and a sensitivity parameter of the at least one of the plurality of software parameters to improve defect detection of the inspection. The technique 900 can also include, in response to detecting a new defect of interest during the inspection, updating the database with pattern data associated with the new defect of interest. The technique 900 can also include, modifying, via the database, a care area parameter of at least one of the plurality of recipe files to scan care areas associated with the pattern data. Detecting a new defect of interest during the inspection can be based on any of the threshold parameter and the sensitivity parameter.

The techniques 450, 550, 650, 750, 800, and the method 900 can be implemented, for example, as a software program that can be executed by computing devices such as system 100. The software program can include machine-readable instructions that can be stored in a memory such as the storage 106 or the memory 104, and that can be executed by a processor, such as the first processing unit 102A or the second processing unit 102B, to cause the system 100 to perform the technique. The techniques 450, 550, 650, 750, 800, and the method 900 can implement teachings consistent with the descriptions of FIGS. 1-7.

For simplicity of explanation, the techniques 450, 550, 650, 750, 800, and the method 900 are depicted and described as a series of steps. However, steps in accordance with this disclosure can occur in various orders, concurrently, and/or iteratively. Additionally, steps in accordance with this disclosure may occur with other steps not presented and described herein. Furthermore, not all illustrated steps may be required to implement a technique in accordance with the disclosed subject matter.

The implementations herein may be described in terms of functional block components and various processing steps. The disclosed processes and sequences may be performed alone or in any combination. Functional blocks may be realized by any number of hardware and/or software components that perform the specified functions. For example, the described implementations may employ various integrated circuit components, e.g., memory elements, processing elements, logic elements, look-up tables, and the like, which may carry out a variety of functions under the control of one or more microprocessors or other control devices. Similarly, where the elements of the described implementations are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the implementations of the disclosure could employ any number of conventional techniques for electronics configuration, signal processing and/or control, data processing and the like.

Aspects or portions of aspects of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an aspect" or "one aspect" throughout is not intended to mean the same implementation or aspect unless described as such.

The particular aspects shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device.

The use of "including" or "having" and variations thereof herein is meant to encompass the items listed thereafter and equivalents thereof as well as additional items. Unless specified or limited otherwise, the terms "mounted," "connected," 'supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed.

The above-described implementations have been described in order to allow easy understanding of the present disclosure and do not limit the present disclosure. To the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for inspecting integrated circuits, the method comprising:
dynamically updating, during an inspection of integrated circuits, at least one of a plurality of recipe files associated with the inspection, by steps comprising:
monitoring the inspection of the integrated circuits to receive inspection data,
wherein the inspection data includes machine data and defect detection results, and wherein the machine data includes inspection machine condition parameters and scanning electron microscope (SEM) images,
wherein the machine data including the inspection machine condition parameters are received from an e-beam inspection system, and
wherein the inspection machine condition parameters relate to states of components of the e-beam inspection system;
storing the inspection data in a database;
modifying, via the database, the at least one of the plurality of recipe files associated with the inspection based on the machine data, wherein the modifying the at least one of the plurality of recipe files includes:
in response to variations in the inspection machine condition parameters, modifying, via the database, any of a machine setup parameter and a scan condition parameter of the at least one of the plurality of recipe files to improve scan performance of the inspection;
in response to the inspection machine condition parameters matching historical machine condition parameters stored in the database:
modifying at least one of the plurality of recipe files to correspond to stored recipe files associated with the historical machine condition parameters; and
updating the e-beam inspection system to use the modified at least one of the plurality of recipe files.

2. The method of claim 1, wherein modifying at least one of the plurality of recipe files associated with the inspection based on the machine data comprises:
in response to inspecting the SEM images, modifying the scan condition parameter of the at least one of the plurality of recipe files to improve SEM image generation.

3. The method of claim 1, wherein modifying at least one of the plurality of software parameters associated with the inspection based on the defect detection results comprises:
in response to inspecting the defect detection results, modifying, via the database, any of a threshold parameter and a sensitivity parameter of the at least one of the plurality of software parameters to improve defect detection of the inspection.

4. The method of claim 3, further comprising:
in response to detecting a new defect of interest during the inspection, updating the database with pattern data associated with the new defect of interest.

5. The method of claim 4, further comprising:
modifying, via the database, a care area parameter of at least one of the plurality of recipe files to scan care areas associated with the pattern data.

6. The method of claim 4, wherein detecting the new defect of interest during the inspection is based on any of the threshold parameter and the sensitivity parameter.

7. The method of claim 1,
wherein the machine condition parameters comprising wafer state coordinates,
wherein the variations in the inspection machine condition parameters comprising a shift in the wafer state coordinates compared to the wafer coordinates, and
wherein modifying, via the database, any of the machine setup parameter and the scan condition parameter comprising:
re-calibrating the relationship between the wafer stage coordinates and the wafer coordinates.

8. A system for inspecting integrated circuits, the system comprising:
a processor; and
a memory including instructions executable by the processor to:
dynamically update, during an inspection of integrated circuits, at least one of a plurality of recipe files associated with the inspection, by instructions to:
monitor the inspection of the integrated circuits to receive inspection data,
wherein the inspection data includes machine data and defect detection results,
wherein the machine data includes inspection machine condition parameters and scanning electron microscope (SEM) images,
wherein the machine data including the inspection machine condition parameters are received from an e-beam inspection system, and
wherein the inspection machine condition parameters relate to states of the e-beam inspection system;
store the inspection data in a database;
modify, via the database, at least one of the plurality of the recipe files associated with the inspection based on the machine data, wherein to modify the at least one of the plurality of recipe files includes to:
in response to variations in the inspection machine condition parameters, modify, via the database, any of a machine setup parameter and a scan condition parameter of the at least one of the plurality of recipe files to improve scan performance of the inspection; and
update the e-beam inspection system to use the modified at least one of the plurality of recipe files.

9. The system of claim 8, wherein to modify at least one of the plurality of recipe files associated with the inspection based on the machine data comprises to:
in response to inspecting the SEM images, modify the scan condition parameter of the at least one of the plurality of recipe files to improve SEM image generation.

10. The system of claim 8, wherein to modify at least one of the plurality of software parameters associated with the inspection based on the defect detection results comprises to:

in response to inspecting the defect detection results, modify, via the database, any of a threshold parameter and a sensitivity parameter of the at least one of the plurality of software parameters to improve defect detection of the inspection.

11. The system of claim 10, the memory further includes instructions executable by the processor to:
in response to detecting a new defect of interest during the inspection, update the database with pattern data associated with the new defect of interest.

12. The system of claim 11, the memory further includes instructions executable by the processor to:
modify, via the database, a care area parameter of at least one of the plurality of recipe files to scan care areas associated with the pattern data.

13. The system of claim 11, wherein detecting the new defect of interest during the inspection is based on any of the threshold parameter and the sensitivity parameter.

14. The system of claim 8,
wherein the machine condition parameters comprising wafer state coordinates, and
wherein the variations in the inspection machine condition parameters comprising a shift in the wafer state coordinates compared to the wafer coordinates.

15. A system for continuous updating of an inspection process during the inspection process, of integrated circuits, the system comprising:
a dynamic knowledge module configured to:
receive, from an e-beam inspection system, inspection data, machine data, and scanning electron microscope (SEM) images,
wherein the machine data includes inspection machine condition parameters, and
wherein the inspection machine condition parameters relate to states of the e-beam inspection system;
a recipe file module configured to:
update, in real-time, recipe files of the e-beam inspection system;
a hot spot predictor module configured to:
receive defect of interest information from the dynamic knowledge module;
generate care areas using the defect of interest information; and
provide the care areas to the dynamic knowledge module; and
a defect detection module configured to:
receive software parameters from the dynamic knowledge module;
generate defect detection data using the software parameters; and
provide the defect detection data to the dynamic knowledge module.

16. The system of claim 15,
wherein the dynamic knowledge module is further configured to:
in response to the inspection machine condition parameters matching historical machine condition parameters stored in the dynamic knowledge module:
modify a recipe file of the recipe files to correspond to stored recipe files associated with the historical machine condition parameters; and
provide the modified recipe file to the recipe file module.

17. The system of claim 15, wherein the dynamic knowledge module is further configured to:
receive, from the defect detection module, a predetermined number of inspection results associated with a hot spot; and
in response to determining that no defect is associated with the hot spot in the predetermined number of inspection results:
update a recipe file of the recipe files to remove a care area associated with the hot spot; and
provide the recipe file to the recipe file module.

18. The system of claim 17, wherein the dynamic knowledge module is further configured to:
instruct the defect detection module to stop determining whether the hot spot is a defect.

* * * * *